United States Patent [19]

Melgaard

[11] Patent Number: 4,821,866

[45] Date of Patent: Apr. 18, 1989

[54] CONVEYOR FOR A CLEAN ROOM

[75] Inventor: Hans L. Melgaard, Minneapolis, Minn.

[73] Assignee: Despatch Industries, Inc., Minneapolis, Minn.

[21] Appl. No.: 138,285

[22] Filed: Dec. 24, 1987

[51] Int. Cl.$^4$ .............................................. B65G 45/00
[52] U.S. Cl. ................... 198/494; 198/860.1; 198/860.3; 198/866; 15/301
[58] Field of Search ................ 198/494, 495, 860.1, 198/860.3, 860.5, 866, 955; 15/301

[56] References Cited

U.S. PATENT DOCUMENTS

| | | | |
|---|---|---|---|
| 2,764,276 | 9/1956 | Ruppe | 198/860.3 X |
| 3,027,989 | 4/1962 | Phillips et al. | 198/495 X |
| 3,749,229 | 7/1973 | Napadow | 198/866 X |
| 3,859,774 | 1/1975 | Bausch . | |
| 3,878,936 | 4/1975 | Niggemyer . | |
| 3,973,665 | 8/1976 | Giammanco | 198/860.5 X |
| 3,976,330 | 8/1976 | Babinski et al. . | |
| 4,051,948 | 10/1977 | Sackett . | |
| 4,355,495 | 10/1982 | Lewis et al. . | |
| 4,515,276 | 5/1985 | Feller et al. . | |

FOREIGN PATENT DOCUMENTS 0973448  11/1982  U.S.S.R. ............... 198/494

Primary Examiner—Robert J. Spar
Assistant Examiner—D. Glenn Dayoan
Attorney, Agent, or Firm—James R. Haller; Mary P. Bauman; Gregory P. Kaihoi

[57] ABSTRACT

A conveyor for transporting articles to or from a clean room or from one place to another within a clean room. The conveyor has housings extending along either side of the path of conveyor travel. Extending between the housings are conveying members, usually metal rods, elongated perpendicularly to the path of conveyor travel. Each housing is slotted so that the ends of the conveying members may extend therethrough. Within each housing are rollers journaled to the ends of the conveying members and a track. The track receives and guides the rollers. Extending along and in air communication with each housing is a plenum, and between each housing and its plenum is an air restriction sheet that restricts the flow of air. The conveyor also includes a blower for drawing a partial vacuum within each plenum thus drawing a lesser vacuum in the housing. Each housing, plenum, air restriction sheet, and blower are arranged so that a pressure differential is created between the housing and plenum. The pressure differential must be great enough to cause air to flow upwardly through the slot of each housing from the area surrounding the surface of the conveying members. The air flow should flow through the slots of the housing at an average velocity of not less than about one hundred feet per minute. The movement of air through the slots draws with it contaminants on or near the surfaces of the conveying members.

18 Claims, 3 Drawing Sheets

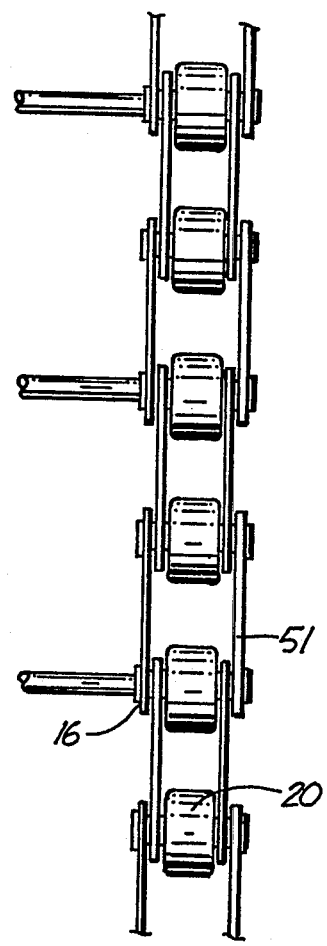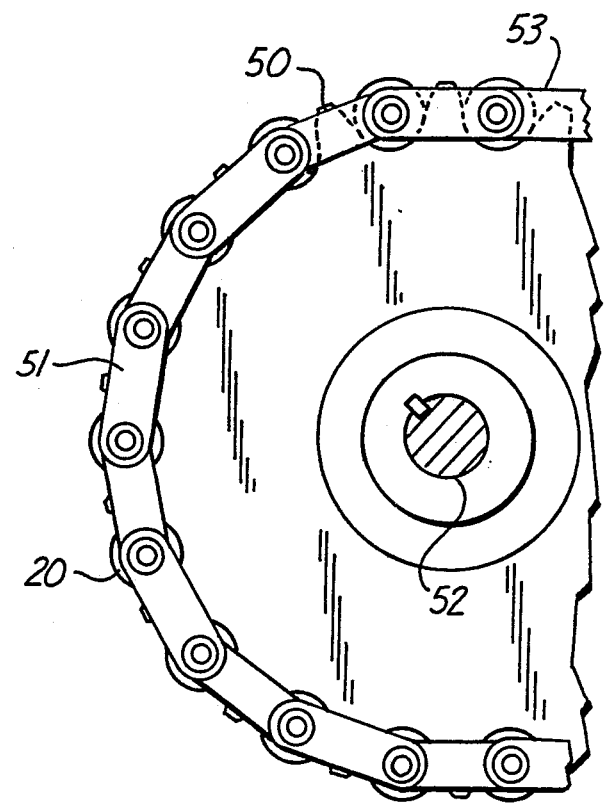
Fig. 3
Fig. 4

CONVEYOR FOR A CLEAN ROOM

FIELD OF THE INVENTION

The present invention relates to conveyors in general and more particularly to conveyors that are particularly suited for use when all or a portion thereof is to be used within a very clean environment.

BACKGROUND OF THE INVENTION

It is often necessary to use conveyors to transport material to or from a "clean room" or from one place to another therewithin. A "clean room" is a room that is kept substantially contaminant-free by employing air filters, lint-free clothing for workers and the like. Such rooms are particularly suitable for the handling of precision parts, medical devices and the like. Conveyor devices such as belts and rollers can carry substantial amounts of particulate contaminants from exterior areas into a clean room. Moreover, in operation, the conveyor apparatus itself can generate dust, particles of material, and other contaminants simply through the interaction of its moving parts.

SUMMARY OF THE INVENTION

The invention relates to a conveyor suitable for use within a clean room. The conveyor comprises a plurality of spaced conveying members for carrying articles to be conveyed. Track means are provided along the path of conveyor travel, and the conveyor includes carriage means movable along the track means for supporting the conveying members. Housing means enclose the track and carriage means, and a plenum extends along and in air communication with the housing means. Means are provided for drawing a partial vacuum in the plenum, and air flow restriction means are provided between the housing means and the plenum to maintain a substantially uniform subatmospheric pressure within the plenum along said path. Slots are provided in the housing means to permit passage of the conveying members therethrough, and the housing means, plenum and means for drawing a partial vacuum are so balanced with respect to one another as to maintain an average air velocity through the housing slots of not less than about 100 feet per minute so that contaminants on or near the conveyor members are drawn through the slots into the housing.

Another embodiment of the invention comprises a method of conveying articles along a path in a clean room. The method employs a plurality of spaced conveying members; drive means provided parallel to and at either side of the path of conveyor travel for propelling the conveyor members along the path and a pair of slotted housings enclosing the drive means at either side of the path of conveyor travel at respective ends of the conveying members. The method further employs a pair of plenums each extending along a housing in air communication therewith. Air restriction means are provided between each housing and its accompanying plenum for restricting air flow therebetween. Means are also provided for creating a partial vacuum within each housing. The method comprises drawing a partial vacuum in each plenum sufficient to result in inwardly directed air flow through the slot of each housing at an average velocity of at least about one hundred feet per minute.

BRIEF DESCRIPTION OF THE DRAWINGS

FIG. 3 is a broken-away top view of a carriage and drive means of the conveyor of FIG. 1; and FIG. 4 is a broken-away front view of a sprocket and chain configuration of the conveyor of FIG. 1.

DETAILED DESCRIPTION OF THE PREFERRED EMBODIMENTS

Figure 1:
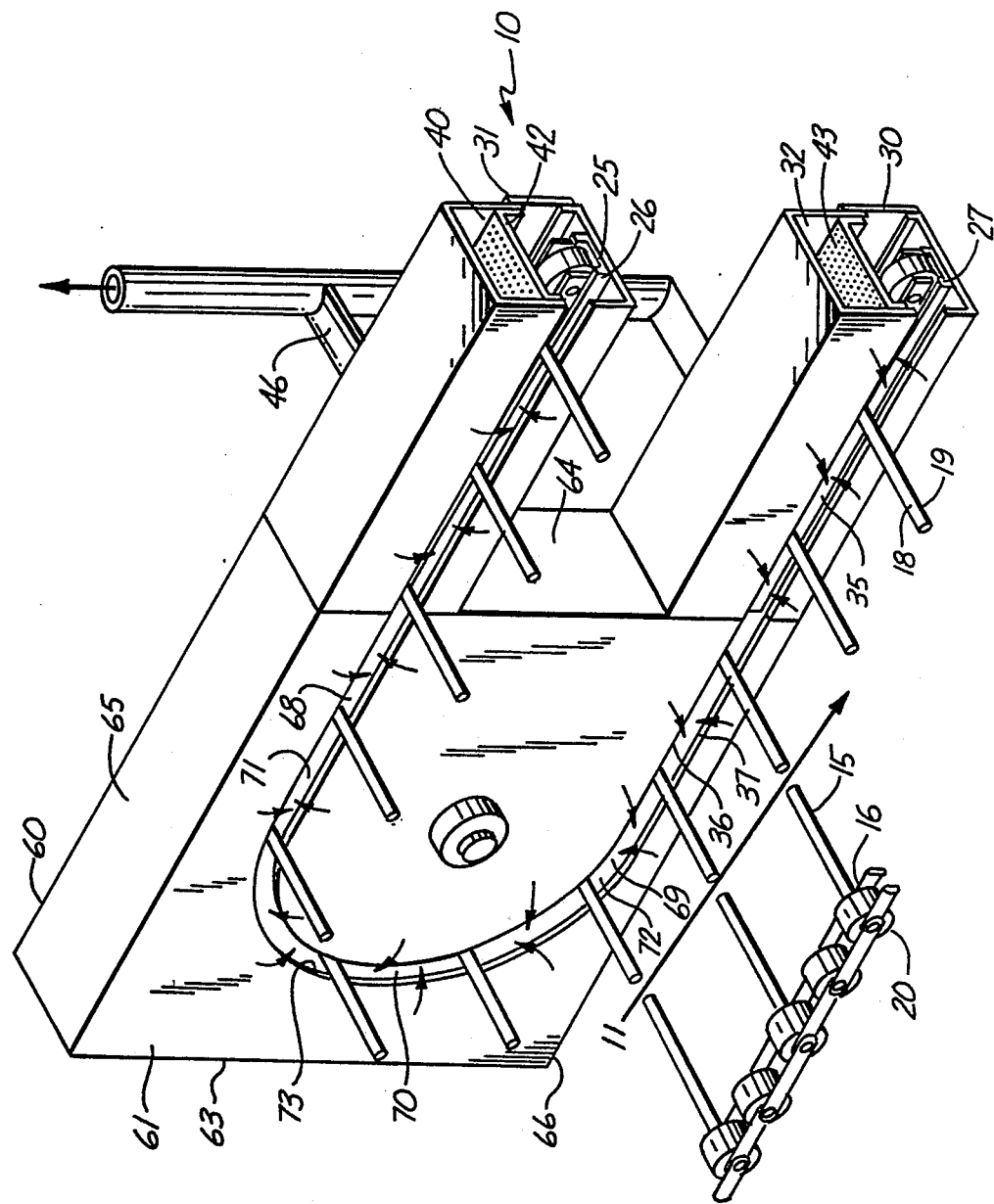
FIG. 1 is a broken-away perspective view of a conveyor of the invention.

FIG. 1 shows one side of the conveyor (10) of the invention that moves articles along a path (11) through the use of conveying members (15). In this embodiment conveyor parts are located at each side of the path of conveyor travel. Only one side of the conveyor will be described; the sides of the conveyor desirably being mirror images of each other.

The conveying members (15) commonly are elongated in a direction normal to the path (11) of travel and desirably are metal rods that may be round in cross section. The rods are desirably spaced from one another by not more than a few rod diameters. The spacing between rods may be varied as desired to accomodate the material to be conveyed. A conveyor sheet or belt (not shown) may be trained about and supported by the rods if desired.

Figure 2:
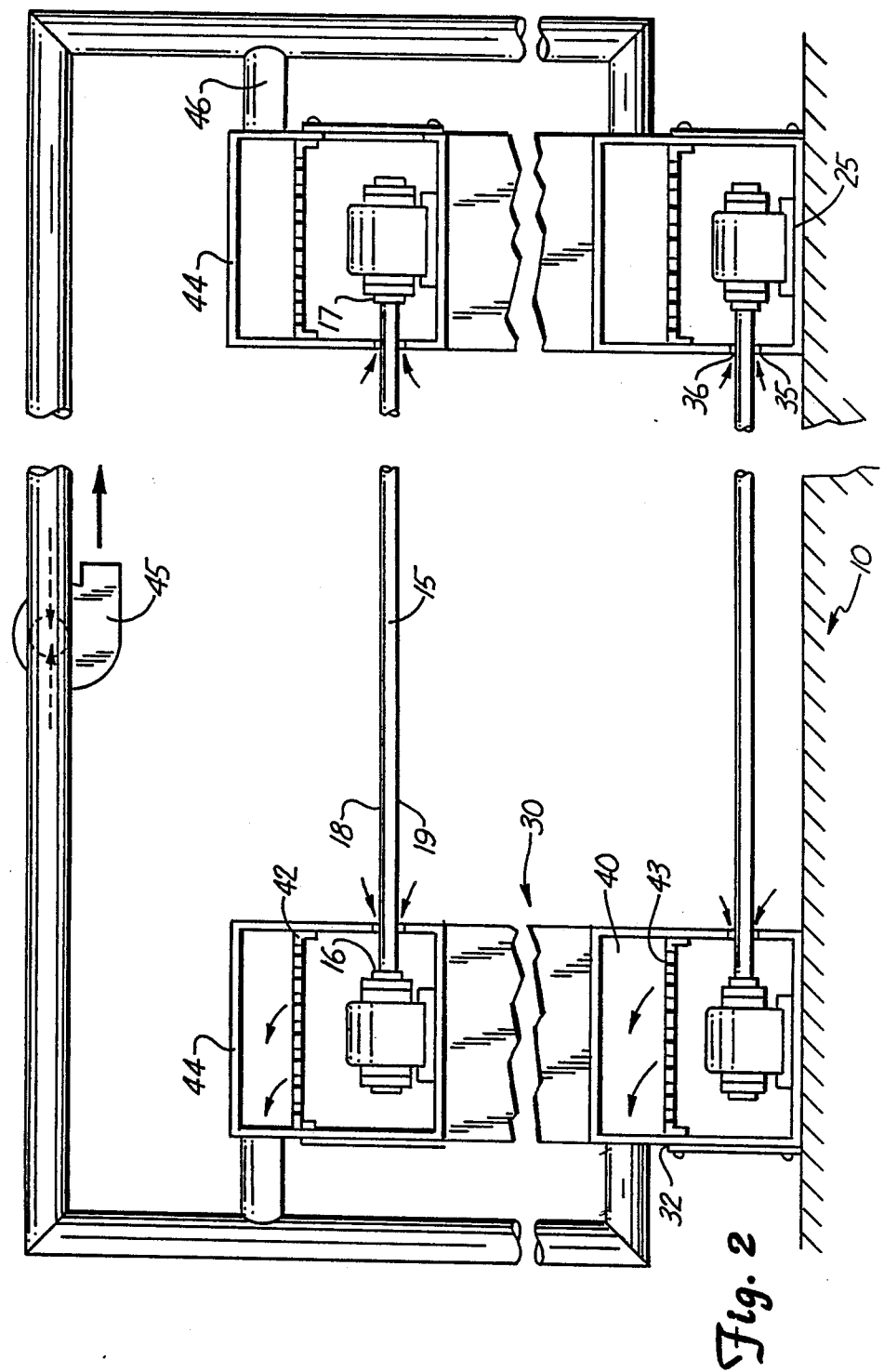
FIG. 2 is a cross-sectional view of the conveyor of FIG. 1.

The rod ends (16, 17) are supported by carriage means, typified in the embodiment shown in FIGS. 1 and 2 as rollers (20) rotatably mounted to the ends (16, 17) of the rods. The rollers (20) travel along a continuous track (25) that may be generally "U" shaped in cross section and that may form an upper (26) and lower (27) horizontal section. These sections desirably are positioned vertically to each other and located parallel to and at either side of the path (11) of conveyor travel.

Drive means are provided to drive the rollers along the conveyor path. The drive means desirably comprises a chain (51) the links of which rotatably support the axes of adjacent rollers (20). The chain and rollers may be driven by a motor-driven sprocket (50) (see FIG. 4).

The track and carriage means are housed by a desirably rectangular, box-shaped housing (30). In the embodiment of the invention shown in FIGS. 1 and 2 the housing is comprised of upper (31) and lower (32) housings; the upper housing (31) enclosing the upper horizontal section (26) of the track (25) and the lower housing (32) enclosing the lower horizontal section (27) of the track. Inner walls of the upper and lower housings are located adjacent the path of conveyor travel. Each inner wall has a slot (35) located parallel to the path through which the ends of the rods extend. The edges (36, 37) of the slots are closely adjacent to the confronting surfaces (18, 19) of the rods. Each horizontal track section is supported by the floor of its respective housing and guides the rollers (20) along the path (11) of conveyor travel.

A plenum (40) extends along each housing in air communication therewith. The plenum (40) may extend alongside, above, or below the housing. The embodiment of the invention shown in FIGS. 1 and 2 depicts a plenum extending above the top of each housing.

Along the horizontal path each plenum and housing are separated by air restriction means. Desirably, the air restriction means is a sheet (42) of stainless steel or the like carrying small perforations (43) to limit the area available for air flow through the sheet. The perforations may measure about 1/32 of an inch in diameter.

Extending from each plenum (40) are conduits (46) that connect the plenum to a blower (45) or other means for drawing a partial vacuum in the plenum. As a partial vacuum is drawn in the plenum (40), air is drawn into the plenum from the housing (30) through the perforations (43) of the sheet (42). The perforated sheet (42) enables a generally uniform partial vacuum within the plenum to be maintained along the path (11). A lesser vacuum thus is created in the housing (30), causing air to be drawn into the housing through the housing slot (35).

The average velocity of air drawn through the slot should be at least about one hundred feet per minute. "Average" air velocity is computed by dividing the volumetric air flow across the slot area by that area. Air flowing rapidly into the slot entrains contaminants from the neighboring areas, thus reducing or eliminating a cause of contamination in the clean room. Since the parts of the conveyor that may generate their own contaminants are enclosed by the housing or may be positioned outside of the clean room, the formation of the partial vacuum in the plenum and a lesser vacuum in the housing causes air to flow always from the clean room environment into the housing and never vice versa. Thus, contaminants generated by the conveyor itself will be retained in the housing and exhausted through the plenum. The housing, plenum, air restriction means and means for creating the vacuum are balanced with respect to one another to provide for the desired air flow velocity through the slots.

In the following discussion, "vacuum" refers to the reduction of air pressure below ambient atmospheric pressure, and is measured in inches of water. Vacuum, as thus defined, increases as air pressure is depressed below atmospheric pressure. Desirably, the vacuum maintained within the plenum is greater than about one inch of water and the vacuum within the housing desirably is not less than about 0.006 inches of water, although it will be understood that the vacuum levels will vary in accordance with the geometry of the system. For any particular geometry, one will normally first calculate the area available for air flow through the slot (35) and will then calculate the volumetric air flow required to provide an air flow velocity through the slot of at least about 100 feet per minute. Applying familiar fluid flow principles, one may then calculate the required pressure drop across the slot, and the resulting required pressure drop across the restriction sheet (42). A blower with sufficient capacity is then provided to maintain the needed vacuum in the plenum (40). The ratio of vacuum in the plenum to the vacuum in the housing is desirably at least about 50:1, and preferably is at least 100:1.

As an example, the conveyor housing may have a slot that is one inch high and ten feet long (neglecting the area blocked by the conveying members). To provide an average velocity through the slot of 100 feet per minute, one must draw 83.3 cubic feet per minute of air through the slot, and this may be accomplished by maintaining the housing at a vacuum of about 0.006 inches of water. The perforations (43) of the air restriction sheet (42) may provide an area available for air flow of approximately 1.8 square inches. To remove 88.3 cubic feet of air (at standard conditions) from the housing, one may draw a vacuum of somewhat greater than one inch of water within the plenum, the resulting average velocity of air flow through the perforations being about 4,000 feet per minute. Because of the restriction to air flow provided by the restrictor sheet, the vacuum drawn within the plenum is fairly uniform from one end of the conveyor path to the other, and this in turn results in fairly uniform flow rates of air through the air restriction sheet perforations and through the slots. Although air may be withdrawn from the plenums at any point along their respective lengths, it is preferred to withdraw air from the plenums at or near their midpoints.

A pair of toothed sprockets (50) may be positioned at each end of the conveyor. The chain (51) is trained around the sprockets, the upper run (53) of the chain lying along the path (11) of conveyor travel and moving in one direction and the lower run (54) of the chain moving in the opposite direction. Each sprocket (50) may be journaled into walls of an end housing (60) positioned at the conveyor ends as shown in FIG. 1, and may be mounted on a drive axle (52) in turn driven by an electric motor (not shown).

In the embodiment of the invention shown in FIGS. 1 and 2 the end housing (60) is a rectangular, boxshaped housing having an inner wall (61), an outer wall (not shown), first and second end walls, (63,64), a ceiling wall (65) and a floor wall (66). The inner wall (61) of the end housing desirably is slotted so that the ends of the conveying members may extend there- through. The slot desirably comprises an upper (68) and lower (69) portion and a portion that is U-shaped in cross-section (70). The upper portion (68) of the end housing slot will desirably be attached to and continuous with the slot of the upper housing (31) of the main housing and the lower portion (69) of the end housing slot will be attached to and continuous with the slot of the lower housing (32) of the main housing. The first end wall (63) of the end housing (60) is located at the end of the conveyor in FIG. 1 and opposite the second end wall housing (64). The second end wall (64) connects the floor of the upper housing (31) with the ceiling (44) of the plenum (40) associated with the lower housing. The inner and outer walls of the end housing desirably are attached to and continuous with the inner and outer walls of the upper and lower housings. The ceiling wall (65) of the end housing desirably is attached to and continuous with a wall of the upper housings, in FIG. 1, the ceiling of the plenum of the upper housing. The floor wall (66) desirably is attached to and continuous with a wall of the lower housing, e.g., the floor wall of the lower housing.

The end housing (60) is necessary only if an end of the conveyor is to be located inside a clean room. It will enclose the conveyor end to prevent contaminants generated by the interaction of the conveyor's moving parts from entering the clean room. To insure that contamination does not occur, the end housing (60) may be divided into three compartments through use of air flow restriction means such as the perforated sheet described above, to form, as shown in FIG. 1, upper (71) and lower (72) plenums and a center housing (73) inbetween. The upper plenum (71) should be provided above the upper portion (68) of the slot and the inner wall and the lower plenum (72) provided below the lower portion (69) of the slot. A vacuum desirably is drawn from the upper and lower plenums by vacuum generating means to create a lesser vacuum within the center housing as air is drawn through the air restriction means. The velocity of air flowing through the slot of the inner wall into the center housing may thus be controlled. The velocity of air drawn through the slots should desirably be at least about 100 feet per minute.

The invention has been described in connection with the embodiments of the drawing in which a pair of parallel tracks are employed between which extend the article-supporting conveying members. Although the thus-described embodiment constitutes the preferred embodiment and the best mode of the invention, it is understood that the conveyor of the invention may include but a single housing and cooperating plenum. For example, if desired, the conveyor members shown at (15) in the drawing may, instead of extending horizontally between a pair of housings, extend instead vertically downwardly through a housing slot and may have hooks on their downward ends to support products along an assembly line.

While a preferred embodiment of the present invention has been described, it should be understood that various changes, adaptations and modifications may be made therein without departing from the spirit of the invention and the scope of the appended claims.

What is claimed is:

1. A conveyor for conveying articles along a given path comprising a plurality of spaced, parallel conveying members elongated in a direction normal to said path; carriage means for supporting respective ends of the conveying members; track means parallel to and at either side of the path for receiving and guiding the carriage means; housing means housing the track and carriage means, a plenum extending along the housing means and in air communication therewith; air restriction means between the housing means and plenum for restricting air flow therebetween; means for creating a partial vacuum within the plenum to thus create a lesser vacuum within the housing means, a slot carried by the housing means to permit passage of the conveying members therethrough, the housing means, plenum, flow restriction means and means for creating a vacuum in the plenum being so constructed and arranged and so balanced with respect to one another as to create an air flow through the slots into the housing having an average velocity of not less than about one hundred feet per minute.

2. The conveyor of claim 1 wherein the elongated conveying members are rods of uniform cross section having ends extending through the housing slot.

3. The conveyor of claim 1 wherein the carriage means comprises rollers journaled to the ends of the conveying members and wherein the track means comprises an elongated track configured to engage and guide said rollers.

4. The conveyor of claim 1 wherein the slot in the housing means has an edge positioned closely adjacent to the surface of the conveying members.

5. The conveyor of claim 1 wherein the restriction means comprises a perforated sheet extending along the path between and separating the plenum and housing means.

6. The conveyor of claim 1 wherein the ratio of vacuum in the plenum to vacuum in the housing means is at least about 50:1.

7. The conveyor of claim 1 wherein the ratio of vacuum in the plenum to the vacuum in the housing is at least more than 100:1.

8. A conveyor for conveying articles along a path comprising a plurality of spaced, parallel rods, rollers journaled to ends of the rods; tracks extending parallel to and at either side of the path for receiving and guiding the rollers; drive means for moving the rods along the path of conveyor travel; a housing enclosing each track and the rollers; a plenum extending along each housing and in air communication therewith; air flow restriction sheets having air transmitting orifices and positioned between the housings and plenums for restricting air flow therebetween; means for drawing air from the plenums to provide a partial vacuum therein and to provide a lesser vacuum within the housings, a slot carried by the housing means to permit passage of the rods therethrough, and the vacuum means having the capacity to remove air from the plenum means at a rate providing an average air velocity through the slot of at least one hundred feet per minute.

9. The conveyor of claim 8 wherein the track comprises upper and lower horizontal sections and another section.

10. The conveyor of claim 9 wherein the housing enclosing the track and the rollers comprises an upper housing enclosing the upper horizontal section of the track and a lower housing enclosing the lower horizontal section of the track.

11. The conveyor of claim 10 including end housing means positioned at a conveyor end and enclosing the other section of the track, the end housing having an inner wall located adjacent the path of conveyor travel and a slot carried by the end housing to permit the passage of the rods therethrough.

12. The conveyor of claim 11 wherein the end housing has upper and lower plenums located above and below a central end housing respectively and in air communication therewith, air restriction means between the central end housing and each of the upper and lower plenums and means for drawing a vacuum in the upper and lower plenums and a lesser vacuum in the central end housing sufficient to cause air to be drawn into the central housing through the slot at an average velocity of at least about 100 feet/minute.

13. The conveyor of claim 8 wherein the drive means comprises sprocket means positioned at least one end of the conveyor and about which chains are trained.

14. The conveyor of claim 8 wherein the housing means and plenum means are coextensive along the path, the restriction sheet forming a common wall therebetween and having a plurality of air transmitting, uniformly arranged holes therethrough.

15. The conveyor of claim 8 wherein the housing means comprises a pair of housings at either side of the path of conveyor travel and housing the track and carriage means and wherein the plenum comprises a pair of plenums extending respectively along each housing and in air communication therewith.

16. A method of conveying articles in a clean room along a path of conveyor travel employing a plurality of spaced, parallel conveying members, drive means provided parallel to and at either side of the path of conveyor travel for propelling the conveying members along the path of conveyor travel, a pair of housings each enclosing drive means at respective ends of the conveying members, a slot carried by each of the housings, a pair of plenums each extending along a housing in air communication therewith; air restriction means between each housing and plenum for restricting air flow therebetween; and means for creating a partial vacuum within each plenum to thus create a lesser vacuum within each housing; the method comprising drawing a partial vacuum in each plenum sufficient to result in an upwardly directed air flow through the slot of each housing having an average velocity of at least about one hundred feet per minute, activating the drive means and placing articles to be conveyed on the conveying members.

17. The method of claim 16 wherein the partial vacuum drawn in each plenum is at least about one inch of water and is substantially uniform along the length of the plenum.

18. The method of claim 16 wherein the vacuum drawn in each plenum is sufficient to create a pressure drop across the air restriction means such that the average velocity of air flow through the air restriction means is at least about 4,000 feet per minute.

* * * * *